United States Patent
Moore

(10) Patent No.: US 8,264,093 B2
(45) Date of Patent: Sep. 11, 2012

(54) WAVE ENERGY CONVERTER

(75) Inventor: Sean Derek Moore, Gosnells (AU)

(73) Assignee: Protean Energy Australia Pty Ltd, Subiaco (AU)

( * ) Notice: Subject to any disclaimer, the term of this patent is extended or adjusted under 35 U.S.C. 154(b) by 571 days.

(21) Appl. No.: 12/373,421

(22) PCT Filed: Jul. 9, 2007

(86) PCT No.: PCT/AU2007/000940
§ 371 (c)(1),
(2), (4) Date: Jan. 12, 2009

(87) PCT Pub. No.: WO2008/006145
PCT Pub. Date: Jan. 17, 2008

(65) Prior Publication Data
US 2009/0309366 A1    Dec. 17, 2009

(30) Foreign Application Priority Data

Jul. 11, 2006    (AU) ................................ 2006903707

(51) Int. Cl.
*F03B 13/10*    (2006.01)
(52) U.S. Cl. ............................................ 290/42; 290/53
(58) Field of Classification Search ................... 290/42, 290/53
See application file for complete search history.

(56) References Cited

U.S. PATENT DOCUMENTS

| 4,098,084 A | 7/1978 | Cockerell |
| 4,308,816 A | 1/1982 | Jourdan |
| 4,367,982 A | 1/1983 | Hubbard |
| 4,434,375 A * | 2/1984 | Taylor .............................. 290/53 |
| 4,455,824 A * | 6/1984 | Dabringhaus ................... 60/507 |
| 4,754,157 A | 6/1988 | Windle |
| 6,695,536 B2 * | 2/2004 | Sanchez Gomez ............. 405/76 |
| 6,768,217 B2 * | 7/2004 | Chalmers et al. ............... 290/53 |
| 6,930,406 B2 * | 8/2005 | Montgomery .................. 290/42 |
| 6,933,623 B2 * | 8/2005 | Carroll et al. ................... 290/42 |
| 7,076,949 B2 * | 7/2006 | Fernandez Gomez et al. . 60/498 |
| 7,420,287 B2 * | 9/2008 | Smushkovich ................. 290/42 |

(Continued)

FOREIGN PATENT DOCUMENTS

AU    197950363    3/1980

(Continued)

*Primary Examiner* — Tho D Ta
(74) *Attorney, Agent, or Firm* — Hamre, Schumann, Mueller & Larson, P.C.

(57) ABSTRACT

A wave energy converting apparatus 44 and its associated tension mooring system 50 is described. The wave energy converting apparatus 44 comprises an elongate support structure 45 designed to extend above a mean water level in the ocean. The support structure 45 has a submerged member 46 provided in connection therewith below the mean water level. A float member 48 of positive buoyancy is slidably mounted on the support structure 45 so as to be movable in a vertical direction. The apparatus 44 also comprises a linear electric generator 49 having a stator provided in connection with the support structure 45 and a translator integrated into the body of the float member 48. Differential motion of the float member 48 relative to the support structure 45 results in the generation of electrical power by the linear electric generator 49. The tension mooring system 50 comprises a cable 51 extending from a ballast means 52 to a counterbalancing means 53 adapted to be suspended from the submerged member 46 via a pulley mechanism 54. The tension mooring system 50 allows the apparatus 44 to be "tuned" to the prevailing ocean conditions.

15 Claims, 16 Drawing Sheets

U.S. PATENT DOCUMENTS 7,443,046 B2 * 10/2008 Stewart et al. .................. 290/53
7,525,214 B2 * 4/2009 Atilano Medina et al. ..... 290/53

FOREIGN PATENT DOCUMENTS

| | | |
|---|---|---|
| AU | 199210115 | 7/1993 |
| AU | 2004100389 | 7/2004 |
| DE | 43 38 103 | 5/1995 |
| DE | 44 46 807 | 6/1995 |
| DE | 199 58 409 | 6/2001 |
| EP | 0 002 146 | 9/1981 |
| FR | 2 309 734 | 11/1976 |
| GB | 1 601 219 | 10/1981 |
| GB | 2 165 006 | 4/1986 |
| GB | 2 176 568 | 12/1986 |
| JP | 53-022934 | 3/1978 |
| JP | 54-026692 | 2/1979 |
| JP | 62-198351 | 12/1987 |
| JP | 62-199078 | 12/1987 |
| JP | 63-097877 | 4/1988 |
| NL | 7808589 | 3/1979 |
| WO | 03/066971 | 8/2003 |
| WO | 03/098033 | 11/2003 |
| WO | 2004/113718 | 12/2004 |

* cited by examiner

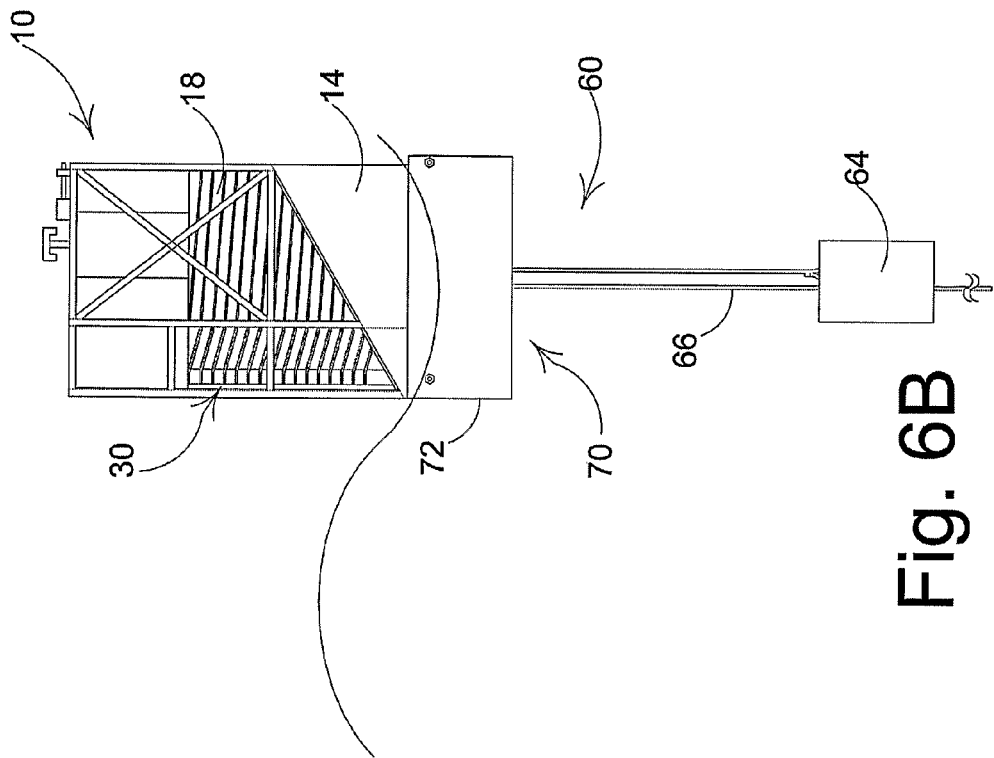
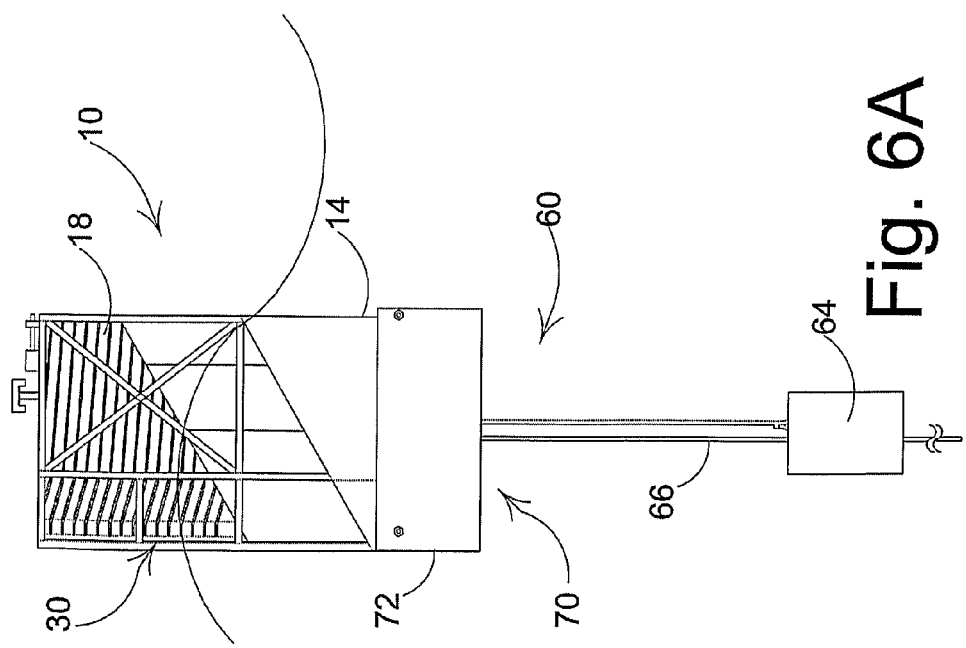

WAVE ENERGY CONVERTER

FIELD OF THE INVENTION

The present invention relates to wave energy converters for converting ocean wave energy into electrical energy and relates particularly, though not exclusively, to such wave energy converters that operate on the principles of buoyancy, hydrodynamic pressures, and oscillation. The invention relates more particularly to a tension mooring system for a wave energy converter.

BACKGROUND TO THE INVENTION

At the beginning of the third millennium the concern of people everywhere is increasingly on sustainability. As people realise that fossil fuels are a finite energy resource, the search for renewable, clean energy sources has become more urgent. Global warming and climate change have focussed attention on the need to reduce our dependence on fossil fuels. One of the most promising renewable energy sources is wave energy. It has been estimated that the worldwide energy potential of wave power is 2 Terawatts, which is equivalent to a worldwide resource of about 2000 TWh per year—sufficient for much of the world's electrical energy requirements. Although there has been a desire to harness the energy of waves for hundreds of years, past attempts have met with limited success. The successes have been on a small scale, in the order of tens to hundreds of kilowatts rather than the hundreds of megawatts required.

One of the major difficulties in the past has been to design a unit that is sufficiently robust to withstand the enormous power that is possessed by the ocean's waves. In storm conditions the wave energy can be massive, causing the destruction of many of the prior art land- or shore-based systems. The typical prior art approach to extracting wave energy has been to use a turbine or hydraulic system. There have been some attempts to use a directly driven rotary generator, as well as a directly driven linear generator. However the most common prior art energy extraction units are oscillating water columns and hydraulic linked rotary generators. These are typically used in near-shore, in-shore or on-shore installations. Another major drawback of such prior art systems is the need to be close to shore where the energy loss for shoreline waves is high due to frictional losses, thus missing out on the majority of the wave energy present in 'deep' water.

The present invention was developed with a view to providing a tension mooring system and a wave energy converter that can be used either near-shore or offshore to extract a maximum amount of ocean wave energy.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a tension mooring system for an apparatus for converting ocean wave energy into a more usable form, the apparatus having a structure with a submerged member provided in connection therewith below the mean water level, the mooring system comprising:
an elongate flexible member extending from a ballast means to a counterbalancing means adapted to be suspended from the submerged member via a pulley mechanism; and
a dampening means for applying a dampening action to the motion of the submerged member, the dampening means applying the dampening action to the elongate flexible member via the pulley mechanism.

Preferably the counterbalancing means comprises a vessel having a mass provided in connection therewith to provide a counterbalancing force applied to the submerged member via the elongate flexible member.

Preferably the counterbalancing means comprises an adjustable buoyancy vessel having a mass provided in connection therewith, wherein the buoyancy of the counterbalancing means can be adjusted to vary the counterbalancing force applied to the submerged member via the elongate flexible member. Preferably the buoyancy of the counterbalancing means can be adjusted by pumping air into the buoyancy vessel via an air hose.

Advantageously the mooring system further comprises a mooring caddy, and the submerged member of the structure is adapted to dock with the mooring caddy. Preferably the submerged member is secured to the mooring caddy by a locking mechanism. Preferably the dampening means and pulley mechanism are housed in the mooring caddy.

According to another aspect of the present invention there is provided an apparatus for converting ocean wave energy into a more usable form, the apparatus comprising:
an elongate support structure designed to extend above a mean water level, having a submerged member provided in connection therewith below the mean water level and a buoyant means to enable the support structure to float in the ocean in a generally upright orientation;
a float member of positive buoyancy slidably mounted on the support structure so as to be movable in a vertical direction; and,
an energy extraction means provided in connection with the support structure and the float member, so that when wave motion causes a suitable differential motion between the float member and the support structure said energy extraction means converts the incident energy into a more usable form.

Preferably the float member is provided with a hydroplane surface adapted to convert a horizontal component of the wave motion into a vertical movement of the float member, thus enhancing the energy extracting capacity of the float member. Typically the float member has an elongate horizontal cross-section with a front end and a rear end, the front end being adapted to face into the general direction of an approaching wave. Preferably said front end is narrowed to a tip. Preferably said hydroplane surface is one of a plurality of substantially parallel hydroplane surfaces extending substantially perpendicularly to and along respective first and second sides of the floating member. Preferably said plurality of hydroplane surfaces are inclined downwards from the front end to the rear end of the float member, wherein water particles in a wave are forced downwards by the hydroplane surfaces, creating hydrodynamic forces acting upwards on the hydroplane surfaces which are added to an upward force acting on the float member due to its positive buoyancy.

According to another aspect of the present invention there is provided an improved float member in an apparatus for converting ocean wave energy into usable energy, the float member comprising:
a positively buoyant member slidably mounted on a support structure so as to be movable in a vertical direction responsive to wave motion, and having a hydroplane surface adapted to convert a horizontal component of the wave motion into a vertical movement of the float member, thus enhancing the energy extracting capacity of the float member.

Preferably the apparatus for converting wave energy further comprises a mooring means for mooring the structure to the seabed. In one embodiment said submerged member and buoyant means are adapted to have substantially neutral buoyancy in use, and said mooring means comprises a tether adapted to prevent the apparatus from drifting but still allow for automatic tracking of the prevailing wave directions.

In another embodiment said submerged member and buoyant means are adapted to have substantially positive buoyancy in use, and said mooring means comprises a braking system for applying a braking action to the support structure via the mooring means. Preferably said braking system is adapted to increase the braking action when the energy extracted by the energy extraction means increases, whereby the differential motion between the float member and the support structure can be maximised and the amount of usable energy generated optimised. Conversely, when little or no energy is being extracted by the energy extraction means the braking system applies no braking action and mechanical stresses on the support structure can be minimised as the mooring means freewheels.

In one embodiment said mooring means comprises a cable extending from a ballast means to a counterbalancing means suspended from the support structure via a pulley mechanism. Typically said braking system applies a braking action to the cable via the pulley mechanism. Preferably said braking system is solenoid activated, electrical power for the solenoid being supplied by the linear electric generator via a shunt circuit. Preferably said braking system is computer controlled.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of the tension mooring system and wave energy converter, given by way of example only, with reference to the accompanying drawings, in which:

FIGS. 6a and 6b illustrate the wave energy converting apparatus of FIGS. 1 and 3 in the crest and the trough respectively of an approaching wave;

DETAILED DESCRIPTION OF PREFERRED EMBODIMENTS

Figure 1:
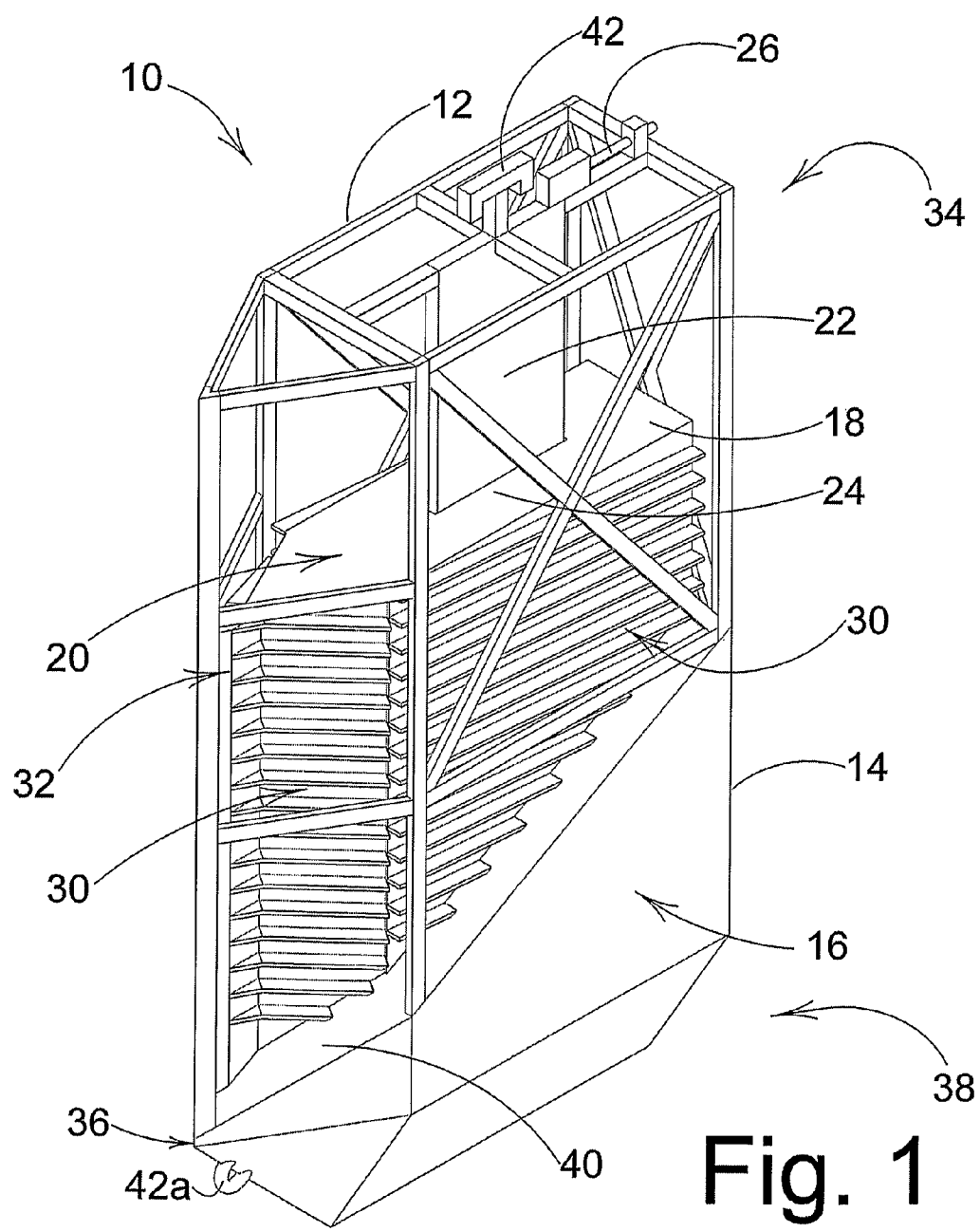
FIG. 1 is a top front perspective view of a first embodiment of a wave energy converting apparatus in accordance with the present invention.
Figure 2:
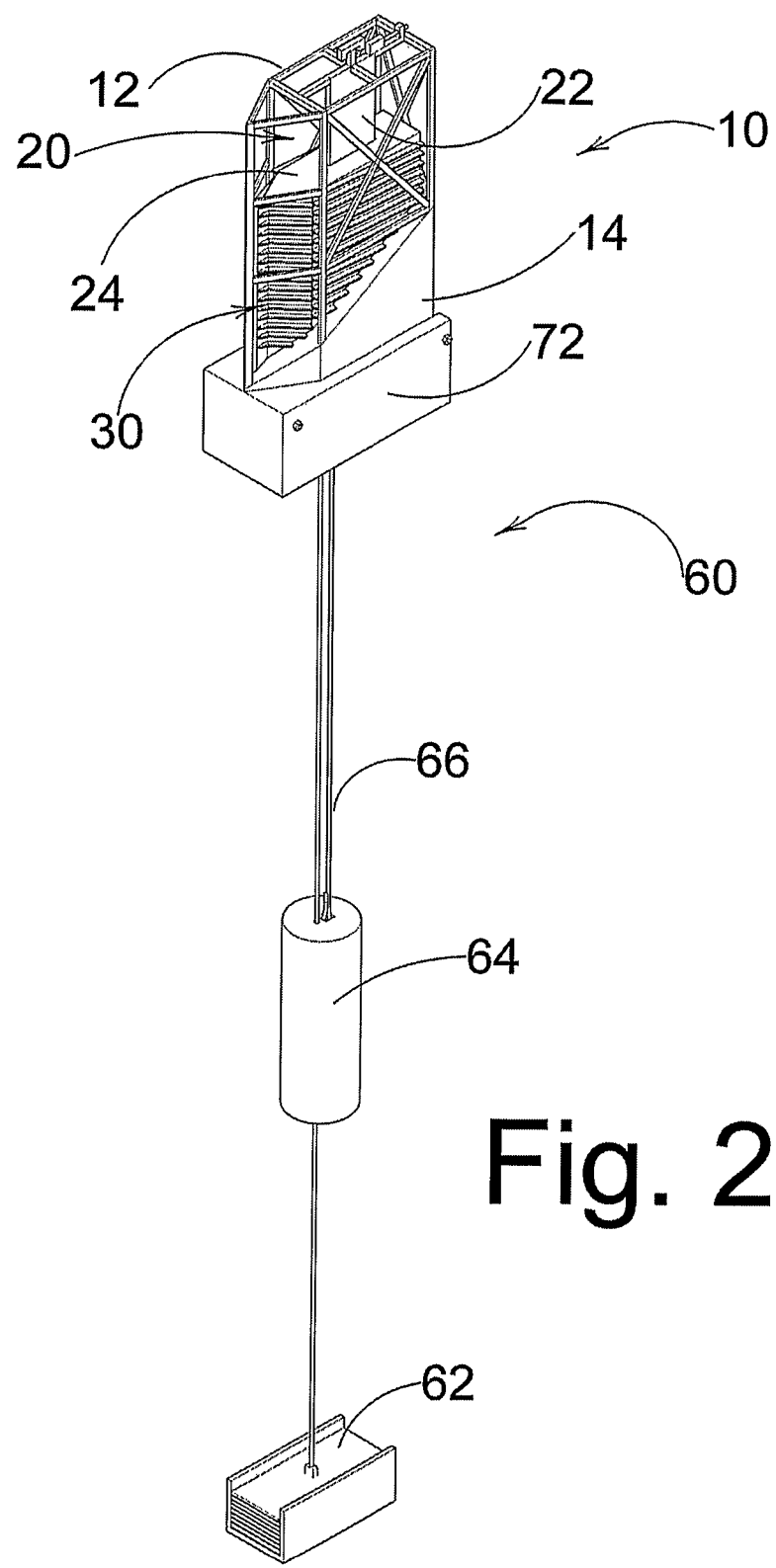
FIG. 2 is a top front perspective view of the wave energy converting apparatus of FIG. 1 with its associated tension mooring system in accordance with the invention.
Figure 3:
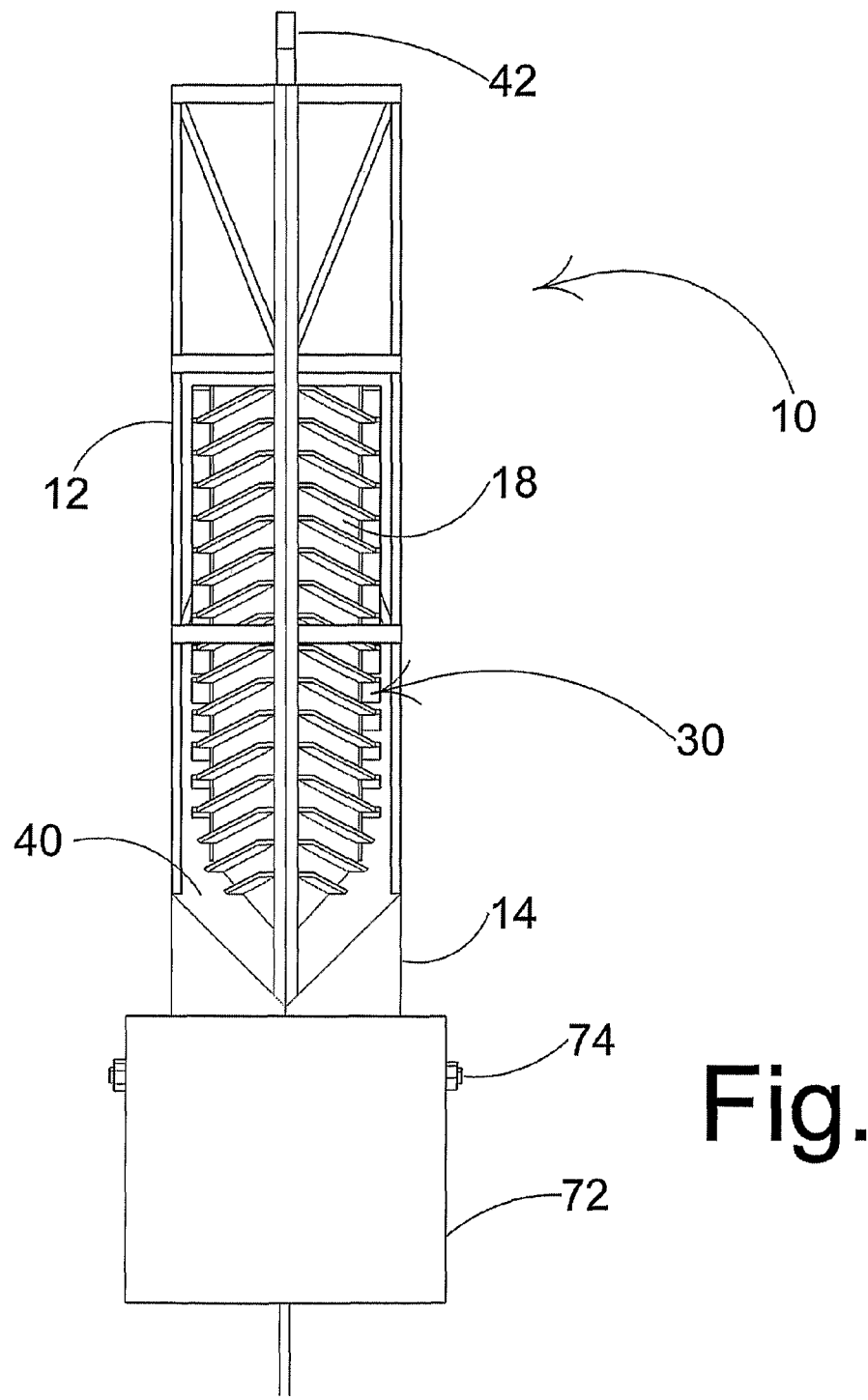
FIG. 3 is a front elevation of the wave energy converting apparatus of FIG. 2.

The energy within an ocean wave is propagated via two orthogonal energies, namely, the horizontal and vertical energies. The vertical energy is contained within the vertical motion of the water particles within the wave, known as heave, and possesses half the available energy of the wave. The horizontal energy is contained in the horizontal motion of the water particles within the wave, known as surge, and also possesses half the energy of the wave. For wave energy extraction to take place there needs to be energy absorption from one or both of these orthogonal energies.

The heave motion describes the z-axis (or up and down) motion of the wave and as such it has a very high correlation with the vertical energy within a wave. The amicability of heaving with wave height makes it a popular and potentially efficient means to extract the vertical energy from a wave. Extraction of the vertical energy in a wave may be implemented in a Wave Energy Converter (WEC) using a single heaving body or two heaving bodies. A single heaving body uses a buoyant mass on top of the surface of the water to extract the vertical energy of a wave. In order to extract energy there needs to be differential motion, generally in the case of a single heaving body the second frame of reference is the ocean floor. By using the ocean floor as a frame of reference it is possible to get the most amount of relative movement and as a result the most amount of energy extracted over as wide a range of frequencies as possible.

The implementation of a single heaving body design can be achieved through two basic configurations. The first is as a buoy floating on top of the water, with an attachment linking the buoy to its reference frame; the buoy will then move with the waves on the ocean's surface producing the differential motion relative to the frame of reference. The second configuration uses a structure fixed to the ocean floor, this structure is located either below or above the mean water level and will have a buoy attached to it; this buoy will then oscillate with the waves on the surface of the water producing differential motion against the fixed reference frame.

In a dual heaving body design the differential motion between two oscillating bodies is used to generate energy; as opposed to the relative motion of one body relative to a fixed reference point, as in a single heaving body design. However an analysis of the efficiency of the dual heaving body design as an oscillating system, over the typical frequency range of ocean waves, indicates that a dual heaving body design is not practical for any serious wave energy extraction. This is further attested by the fact that there are no commercial installations using this type of differential motion. The existing commercial versions of a heaving buoy use various implementations of a single oscillating body.

The other aspect of wave motion pertinent to the present invention is that of surge. As mentioned previously surge is motion along the x-axis and is very amicable for the extraction of energy from the horizontal energy of a wave. A surging body is capable of extracting half of the wave energy, namely the horizontal energy component of a wave. By combining surging and heaving it is theoretically possible to extract 100% of the ocean wave energy. Clearly there is a huge benefit in utilizing means capable of extracting the energy from both of these vectors. This is really only achievable in theory as other factors such as wave non-linearities, multi-directional waves and other variables influence the motion of the body. Preferred embodiments of the present invention typically seek to harness both surging and heaving in order to achieve optimum wave energy extraction. Advantageously the WEC of the invention employ a hydrofoil or hydroplane to access the horizontal energy in an ocean's wave. A hydroplane can be used to divert the mass of water travelling in the wave and thus produce a net force in any direction.

The preferred embodiments of the WEC of the present invention typically employ a surging and heaving body design, which uses multiple degrees of freedom to extract energy from the travelling waves of the ocean. The WEC converts these heaving, and surging motions of the water particles into vertical forces which in turn move the translator of a linear electric generator in differential motion with its stator. The linear electric generator converts this differential motion to an induced potential difference that can be applied to a load, thus allowing useful work to be done with the chaotic energy of an ocean's wave.

In the preferred embodiments of the WEC of the present invention heave response is not solely used to convert the energy within a wave. In the present invention heave response may also be used to 'tune' the operational frequencies, such that frequencies below its tuned frequency will experience minimal attenuation. A tension mooring system in accordance with the invention is employed in association with the WEC to achieve this tuneability. Such a novel use of heave increases the survivability of the WEC without sacrificing the efficiency of the energy extraction. This approach is different to prior art devices, which only use the heave response of the body(s) to generate their energy. For clarity, a heave response is the vertical oscillation experienced by a body in response to the heave of a wave. A heave response is an artefact of buoyancy and mass only. A possible embodiment of the tension mooring system in accordance with the invention may also itself be used to extract energy from the heave of a wave, as will be described in more detail below.

A preferred design of the WEC is such that it has only one moving (or working) member, this member is located above the mean water level within what is commonly termed the splash zone. The system is an oscillatory system that uses forces derived from the surge and heave of the water particles within the wave. These forces are then used to drive the partially submerged structure down, while the float is driven up. A tension mooring system is preferably associated with the WEC to tension the submerged structure relative to the ocean floor. The opposing motion of the two bodies ensures the maximum amount of differential motion and hence the maximum amount of energy extracted from the wave.

A first embodiment of the wave energy converting apparatus 10 of the present invention, as illustrated in FIGS. 1 to 7 of the accompanying drawings, comprises an elongate support structure 12 designed to extend above a mean water level in the ocean. The apparatus 10 uses surging, heaving, buoyancy and hydrodynamic forces to extend the theoretical maximum energy extraction from 50% for a single heaving body to 100%. The support structure 12 is in the form of a frame having a submerged member 14 provided in connection therewith below the mean water level. The support structure 12 is also provided with a buoyant means to enable the support structure to float in the ocean in a generally upright orientation. In the illustrated embodiment the buoyant means is in the form of a buoyancy tank 16 provided within the submerged member 14, as will be described in more detail below. In this embodiment the buoyancy tank 16 is normally filled with sufficient air to give the submerged member 14 an overall positive buoyancy. It will therefore be referred to in this embodiment as a positively buoyant submerged member (PBSM) 14. The buoyancy of the PBSM 14 extends beyond the mean water level such that if the water level were to rise the associated buoyancy force would also increase. In an alternate embodiment the submerged member 14 is filled with sufficient air to ensure that the submerged member has a total mass equal to the mass of the water it displaces, i.e. it has neutral buoyancy.

The apparatus 10 further comprises a float member 18 of positive buoyancy slidably mounted in the support structure 12 so as to be movable in a vertical direction within the support structure 12. The apparatus 10 also comprises a linear electric generator 20 having a stator 22 provided in connection with the support structure 12 and a translator 24 provided in connection with the float member 18. The stator 22 of this embodiment is of planar, elongate construction and extends vertically along a central plane of the support structure 12, from the positively buoyant submerged member (PBSM) 14 below the mean water level to a position above the mean water level. In this embodiment the translator 24 is integrated into the body of the float member 18, as will be described in more detail below. Electrical power generated by the linear electric generator 20 is tapped off via an electrical power terminal 26 provided at the top end of the stator 22, and may be carried to shore via a suitable underwater cable (not shown) or by wireless (microwave) transmission.

The float member 18 of the PBSM 14 is a buoyant member and has a density of half that of the water it displaces. It typically also has a volume less than or equal to the volume of the submerged member 14. The combination of these two parameters makes the mass of the floating member 18 less than or equal to half the mass of the PBSM 14. The buoyancy of the PBSM 14 provides an opposing force sufficient to counter the downward force produced by the linear electric generator 20 on its downward return stroke. The float member 18 is free to move vertically along the stator 22 via low friction guides. These low friction guides can typically be implemented as a sealed bearing surrounded by a plastic or rubber sleeve (not visible) located on the float member 18, with a corresponding channel or guide located on the stator 22. Other possible configurations for low friction guides will be evident to persons skilled in the art. When wave motion causes a suitable differential motion between the float member 18 and the support structure 12, the translator 24 is translated relative to the stator 22 and the linear electric generator 20 generates electrical power.

Preferably the float member 18 is provided with a hydrofoil/hydroplane surface 30 adapted to convert a horizontal component of the wave motion into a vertical movement of the float member 18, thus enhancing the energy extracting capacity of the float member 18. The float member 18 has an elongate horizontal cross-section, with a front end 32 and a rear end 34, the front end 32 being adapted to face into the general direction of an approaching wave. The front end 32 is narrowed to a V-shaped tip. Preferably the hydroplane surface 30 is one of a plurality of substantially parallel hydroplane surfaces 30 extending perpendicularly to and along respective first and second sides of the float member 18. The hydroplane surfaces 30 are inclined downwards from the front end 32 to the rear end 34 of the float member 18. This configuration ensures that water particles in an approaching wave are forced downwards by the hydroplane surfaces 30, creating hydrodynamic forces acting upwards on the hydroplane surfaces 30 which are added to an upward force acting on the float member due to its buoyancy.

The PBSM 14 also has an elongated horizontal cross-section, with a front end 36 and a rear end 38, the front end 36 being adapted to face into the general direction of an approaching wave. The front end 36 is narrowed to a V-shaped tip and PBSM 14 has a V-shaped hull like a boat, as can be seen most clearly in FIG. 1. Preferably the PBSM 14 has a substantially planar upper surface 40 which is inclined upwards from the front end 36 to the rear end 38 of the submerged member, wherein water particles in a wave approaching from the front are forced upwards by the planar upper surface 40 creating a downward force acting upon the PBSM 14.

The PBSM 14 is designed such that resistance to downward movement of the member is, to whatever extent possible, minimised. On the other hand, upward movement of the PBSM 14 (and hence of the entire support structure 12) is hindered by using hydrodynamic forces derived from the viscous force of the planar upper surface 40 moving in an upward direction and the tethering force of the tension mooring system. As water particles in the crest of a wave encounter the float member 18 they are forced downwards by the hydroplane surfaces 30. This produces an upward force on the float member 18. On the other hand as the water particles encounter the PBSM 14 they are forced upwards by the inclined upper surface 40. This produces a downward force on the PBSM 14. Hence, when a wave encounters the apparatus 10 there will be an upward force acting upon the float member 18, and a downward force acting upon the PBSM 14, due to the wave's horizontal motion. The downward force applied to the PBSM 14 will be opposed by the damping provided by the linear electric generator 20. The result of the upward force applied to the float member 18 via its hydroplanes 30 and buoyancy is an upward movement of the translator 24 of the linear electric generator 20. Through the interaction of these buoyant and hydrodynamic forces it is possible to maximise the differential motion between the float member 18 and the support structure 12 in order to optimise the energy extracted from the wave by the apparatus 10.

Figure 4:
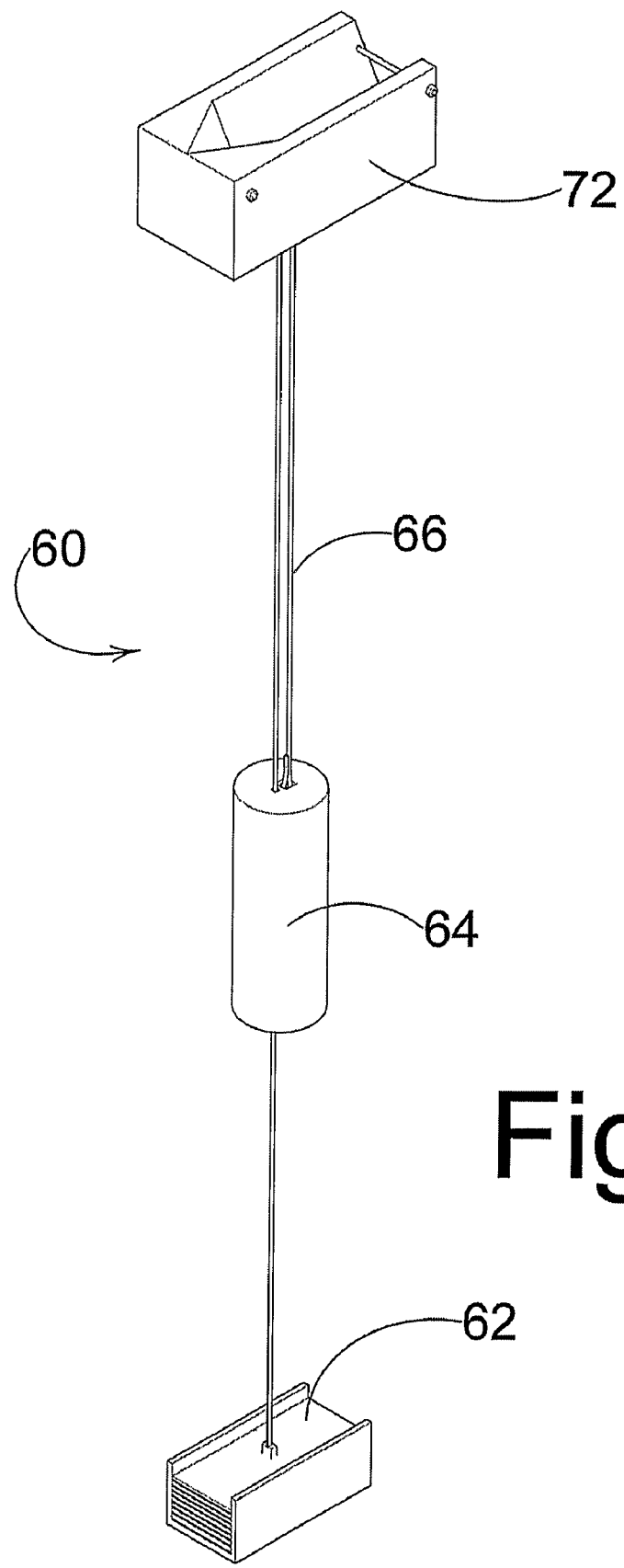
FIG. 4 is a top front perspective view of the tension mooring system employed with the wave energy converting apparatus of FIG. 1.
Figure 5:
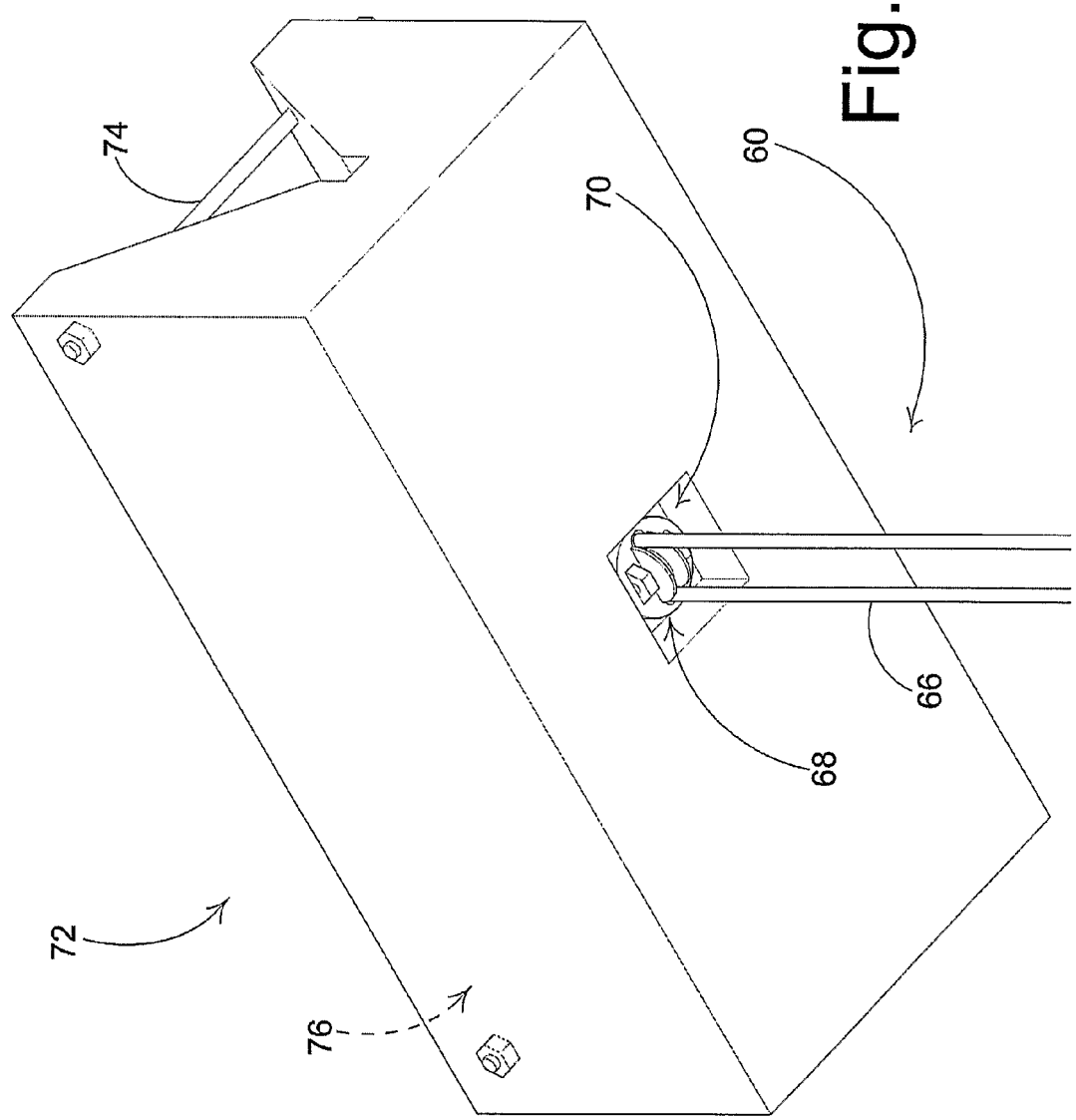
FIG. 5 is a bottom rear perspective view of a mooring caddy incorporated in the tension mooring system of FIG. 4.

To counteract the upward buoyant force on the PBSM 14 a novel tension mooring system has been invented, of which a preferred embodiment, in the form of mooring means 60, is illustrated in FIGS. 4 and 5. The mooring system 60 comprises a ballast 62 for anchoring the device, and a counterbalancing means 64 for counteracting the excessive buoyancy of the PBSM 14. The ballast 62 and the counterbalancing means 64 are connected via a chain or cable 66, which passes through a pulley mechanism 68 located at the bottom of the PBSM 14 (see FIG. 5). A dampening means in the form of a mechanical braking system 70 is provided in connection with the pulley mechanism 68, though some other dampening means such as an electrical or hydraulic or pneumatic dampener can be used. The braking system applies a braking or damping action to the cable via the pulley mechanism 68. The braking system 70 effectively applies a braking action to the PBSM 14, and hence to the support structure 12 of the apparatus 10, via the mooring means 60. The braking system 70 is typically solenoid activated, electrical power for the solenoid (not shown) being supplied by the linear electric generator 20 via a shunt circuit. Therefore the braking system 70 will not engage if there is no electricity being produced. The proportion of braking will be dependent upon the amount of current being produced. If a small power demand is being met, or the wave frequency is outside the operational parameters of the linear electric generator 20, then the braking system 70 will be off. However, as the power produced increases so will the braking, thus maximizing the differential motion between the two members and optimizing the amount of energy produced. Preferably the braking system is computer controlled.

FIG. 6 illustrates the operation of the braking system 70. When a wave of the desired frequency passes through the apparatus 10, the float member 18 will move upwards due to its positive buoyancy and the hydrodynamic forces acting on the hydroplane surfaces 30 (FIG. 6a). In this wave energy extracting mode, the linear electric generator 20 is producing electrical power and this will result in the application of a braking action via the braking system 70 to the cable 66 of the mooring means 60. Hence counterbalancing means 64 will not move and the PBSM 14 remains stationary. On the other hand as the float member 18 returns to its lowered position, as shown in FIG. 6b, it produces electrical power due to the excess buoyancy of the PBSM 14 held in position by the braking system 70. When the braking system 70 is off the counterbalancing means 64 is able to move freely up or down on cable 66.

By means of this simple control system it is possible to implement an effective and adaptable means of controlling the motion of the PBSM 14. By only engaging the braking system 70 when energy is being produced, there will be a general decrease in unnecessary stress on the system for times when no energy is being produced. The braking system 70 may have a contact switch (not visible) located at the top of the PBSM 14 which will be opened if the float member 18 moves to the extent of its allowable movement. Once the switch is opened the shunt to the solenoid will be opened, thus allowing the PBSM 14 to rise in altitude and relieve the upward stress provided by the float member 18. This altitude adjustment will continue until such time as equilibrium is achieved.

The mooring means 60 is designed to be a fully automatic adjustment system, which will keep the mean water level of the apparatus 10 at a consistent level. If the apparatus 10 moves away from the shortest distance between the ballast and the PBSM, a corrective force will come into play that will return the system to the shortest distance between the two points. This corrective force will be a fully automatic force due to the gravitational force. The automatic control system of the apparatus 10 is such that all wave frequencies outside of the predefined operational range will be passed by the whole of the support structure 12 and not just the float member 18. This approach will allow the system to automatically calibrate itself to the prevailing mean water level, thus allowing it to adjust to tidal fluctuations, storm surges and other low frequency phenomenon, which if not planned for could lead to the destruction of the wave energy converter.

Figure 7B:
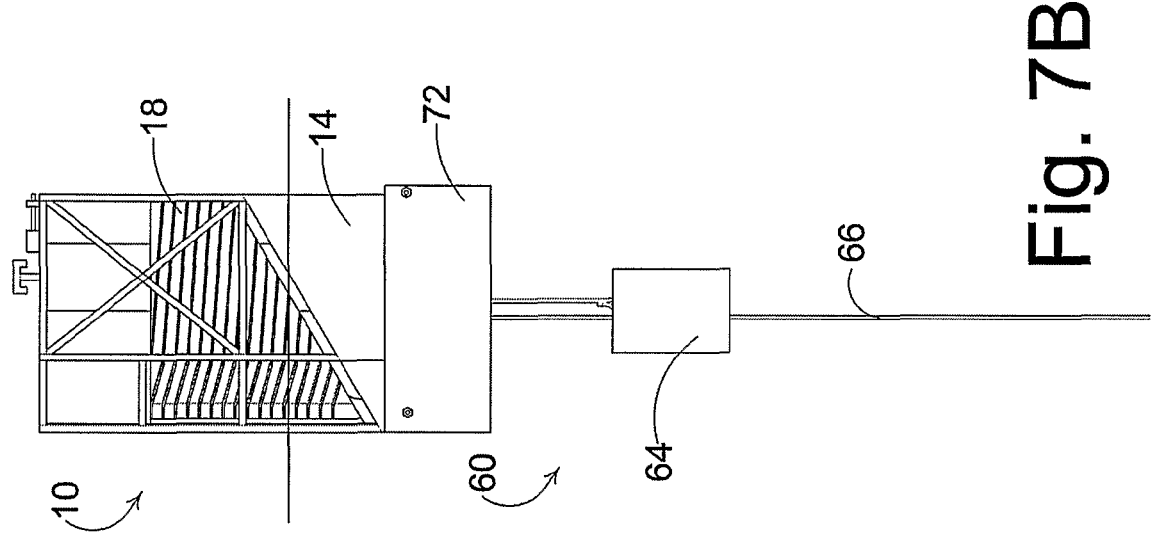
FIGS. 7a and 7b illustrate the operation of the wave energy converting apparatus of FIGS. 1 and 2 during variations in the mean water level.
Figure 7A:
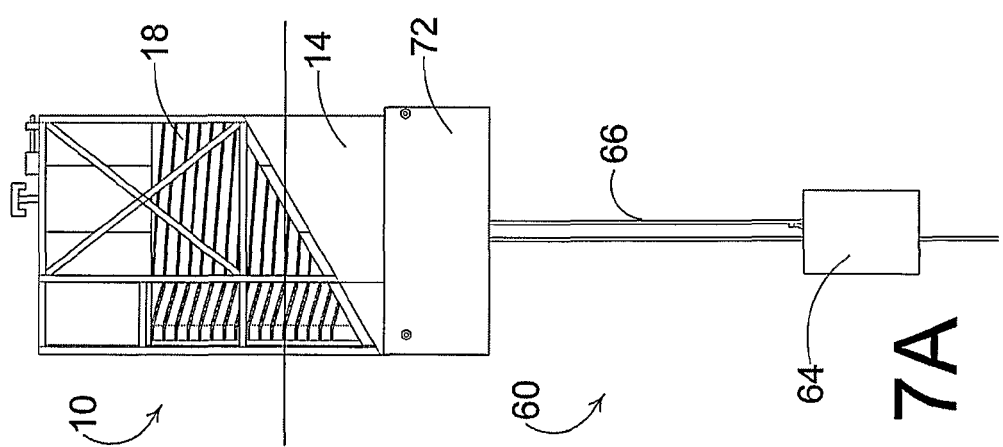

FIG. 7 illustrates this automatic calibration of the apparatus 10 to the mean water level. In this case, the wave frequency is outside the predefined operational range of the apparatus 10, and hence the float member 18 remains essentially stationary relative to the PBSM 14 irrespective of the water level, and there is no differential motion to produce electric power via the linear electric generator 20. Hence the braking system 70 remains inactivated and the mooring system 60 freewheels. The counterbalancing means 64 moves up and down with changes in the mean water level, as shown in FIGS. 7a and 7b respectively.

In this embodiment the mooring means is implemented in the form of a mooring caddy 72, in which the PBSM 14 of the support structure 12 is adapted to dock in use. FIG. 5 illustrates a preferred embodiment of the mooring caddy 72. The PBSM 14 is secured in the mooring caddy 72 by a suitable locking mechanism, which may automatically secure the PBSM 14 as it docks in the mooring caddy 72. In the illustrated embodiment the PBSM 14 is manually secured to the mooring caddy 72 via securing bolts 74. The braking system 70 and pulley mechanism 68 are preferably housed in the mooring caddy 72. All the components required to implement the wave energy converting apparatus of this embodiment may be housed in the mooring caddy 72. The mooring caddy 72 preferably has its own buoyancy tank 76 (not visible) which can be filled or evacuated with compressed air as required to lift or lower the caddy 72 in the water during docking, maintenance or operational situations.

The counterbalancing means 64 of the mooring means 60 will essentially be a mass, though it is intended that the counterbalance will not be a completely inert mass. Preferably the counterbalancing means 64 comprises a denser-than-water substance (e.g. concrete) and an air chamber within (not visible).

The air chamber is designed so that when filled it will provide sufficient buoyancy to lift the counterbalancing means 64 to the surface of the water. When the air chamber is filled with water it will add additional mass to the system thus increasing the system's performance for lower frequencies. Another aspect of the counterbalancing means 64 is the ability to refill the air chamber within, either remotely and/or directly. When the air chamber is re-filled the counterbalancing means will ascend to the surface of the water in such a fashion that the caddy 72 will be located to the top of the counterbalancing means 64, thus allowing for extraction or maintenance to be performed on the PBSM 14.

A second use of the counterbalancing means 64 is as an automatic commissioning system. The commissioning of the system will be such that the mooring means 60 will be set, which includes the ballast 62 and the counterbalancing means 64. The counterbalancing means 64 will be left in its buoyant state until such time as the apparatus 10 is ready to be commissioned. When the apparatus 10 is to be commissioned it will be attached to the exposed caddy 72, after which the counterbalancing means 64 will be filled with water, thus automatically setting the apparatus 10 into its correct working position, without the need for divers and highly specialized equipment. This novel way of commissioning the apparatus 10 will help to keep the commissioning, decommissioning, repairs and maintenance costs to a minimum. An alternative configuration is for the counterbalancing means 64 to be constructed solely of denser than water material (such as concrete) and that the caddy 72 is the adjustable buoyant chamber used to raise and lower the counterbalancing means 64.

The linear electric generator 20 used by the apparatus 10 is designed to provide the optimal frequency response and EMF to allow the most amount of energy to be extracted from the waves of the ocean. This optimization is achieved by matching the performance parameters of the linear electric generator 20 to the damping requirements of the mechanical system in such a way that critical damping of the oscillating system will be achieved when the system is under full load.

The linear electric generator 20 within the apparatus 10 is such that the stator 22 is part of an oscillating body system which is in a predominantly stationary reference frame, while the translator 24 is attached to the predominantly moving reference frame. In the illustrated embodiment the stator 22 is connected to the submerged member 14, while the translator 24 is connected to the float member 18. In reality both of these parts will be moving, though for the sake of adhering to popular naming conventions, the terms "stator" and "translator" will be used to refer to the predefined WEC structures. As the motion of the stator 22 and the translator 24 are subjective, the locations of the copper wire, magnets, and magnetic permeable material can also be located on either the stator or the translator. The location of these materials will depend upon the specific requirements and design criteria of the implementation of the apparatus.

The wave energy converting apparatus 10 is configured in such a way to be easily towed behind a vessel, thus allowing it to be readily and quickly commissioned. The V-shaped hull of the PBSM 14 facilitates effective towing of the wave energy converting apparatus 10. To commission or decommission the apparatus 10 high-pressure air is applied to a valve 42 located above the mean water level. In the illustrated embodiment the valve 42 is located at the top of the stator 22 and is connected to a fluid passage (not visible) that extends down through the stator 22 to the buoyancy tank 16 in the body of the PBSM 14. High-pressure air pumped into the buoyancy tank 16 via the valve 42 and through one fluid passage expels ballast water from within the buoyancy tank 16 through the other fluid passage, thus causing the PBSM 14 to rise above the mean water level. When the buoyant member 14 is above the mean water level the energy production will stop and the entire support structure 12 will behave as a boat thus enabling easy transport of the apparatus 10.

When commissioning the apparatus 10, any excess buoyancy of the buoyant member 14 is released by the reverse process thus re-submerging the support structure 12 and re-instating the energy production. This type of rapid deployment and retrieval aids in keeping the cost of commissioning, repairs and maintenance to a minimum, as well as ensuring the most reliable supply of energy.

Another advantageous aspect of the apparatus 10 is that it can be engineered to be responsive, for electric power generation, to a specific wave frequency range. In the illustrated embodiment the horizontal length of the apparatus 10 is approximately five meters, which corresponds to a quarter wavelength of an ocean wave of 20 meter wavelength. This feature is particularly useful when applied to the ocean, as the energy available within ocean waves increases the lower the frequency. In the past many wave energy converters have been lost during storm conditions due to exposure to excessive wave energy densities. With the frequency tuning ability of the apparatus 10, it is possible to extract energy from the predefined frequencies only, while simply letting the destructive high energy density waves pass without attenuation. The consequences for the survivability of the apparatus 10 are significant, not to mention the benefit of being able to produce power when other wave energy converters would have to be taken out of service to ensure their survival.

The wave energy converting apparatus 10 may be constructed as a modular unit and may be one of a plurality of such modular units that are connected together as a wave energy converting power array or power matrix. In the illustrated embodiment the frame of the support structure 12 is of substantially rectangular configuration. This shape facilitates the interconnection of a plurality of the modular units side by side in two orthogonal directions.

FIGS. 8 to 11 illustrate a second embodiment of a wave energy converting apparatus 44 and its associated tension mooring system 50 in accordance with the invention. The wave energy converting apparatus 44 comprises an elongate support structure 45 designed to extend above a mean water level in the ocean. The support structure 45 is in the form of a vertically oriented column having a submerged member 46 provided in connection therewith below the mean water level. The support structure 45 of this embodiment is also provided with a buoyant means to enable the support structure to float in the ocean in a generally upright orientation. In the illustrated embodiment the buoyant means is in the form of a buoyancy tank 47 (not visible) provided within the submerged member 46. As with the previous embodiment, the buoyancy tank 47 is normally filled with sufficient air to give the submerged member 46 an overall positive buoyancy.

The apparatus 44 further comprises a float member 48 of positive buoyancy slidably mounted on the support structure 45 so as to be movable in a vertical direction. In this embodiment the float member 48 is of spherical configuration and is slidably mounted on the vertical column of the support structure 45. The apparatus 44 also comprises a linear electric generator 49 having a stator provided in connection with the vertical column of the support structure 45 and a translator integrated into the body of the float member 48. Operation of the wave converting apparatus 44 of this embodiment, for converting ocean wave energy into electrical power, is similar to that of the first embodiment 10 and will not be described in detail again here. The hydrodynamic and buoyant properties of the spherical float member 48 will produce a differential motion of the translator of the linear electric generator 49 relative to the stator, as in the previous embodiment. Advantageously the upper surface of the submerged member 46 is of substantially hemispherical configuration, so as to act as a deflecting surface for the water (not unlike the upper surface 40 of the first embodiment), to further enhance this differential motion.

Figure 9:
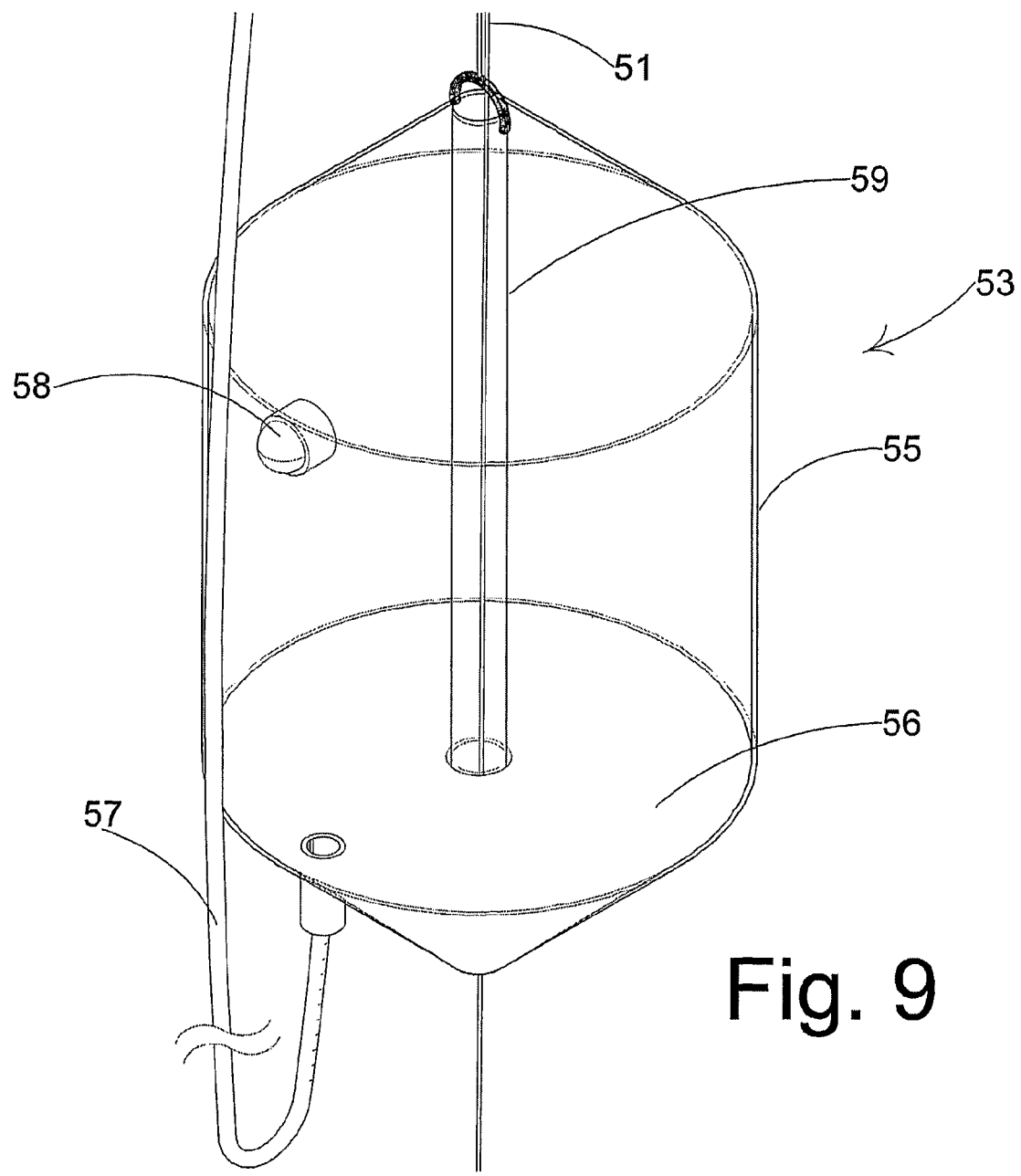
FIG. 9 is a partially transparent, top perspective view of a counterbalancing means which is part of the tension mooring system associated with the wave energy converting apparatus of FIG. 8.

The tension mooring system 50 of this embodiment comprises an elongate flexible member in the form of a cable 51 extending from a ballast means 52 to a counterbalancing means 53 adapted to be suspended from the submerged member 46 via a pulley mechanism 54. The ballast means 52 may take the form of a large block of concrete, or alternatively a suitable sea bed mooring may be employed to anchor one end of the cable 51 to the ocean floor. The counterbalancing means 53 comprises a mass having an adjustable buoyancy tank provided in connection therewith, as illustrated in FIG. 9.

The counterbalancing means 53 of this embodiment is in the form of a hollow vessel 55 having a solid base 56 of a predetermined mass to act as a counterweight for the submerged member 46. The remaining volume of the vessel 55 can be filled with compressed air via an air hose 57 to adjust the buoyancy of the vessel 55. A valve 58 may be provided in a wall of the vessel 55 to expel air to the ambient ocean. The other end of the cable 51 is connected to the top of the vessel 55 and extends up to the pulley mechanism 54, before it passes back down through a hollow passage 59 extending vertically along the central axis of the vessel 55 to the ballast means 52.

By adjusting the buoyancy of the vessel 55 the counterbalancing force applied to the submerged member 46 via the cable 51 can be varied. In this manner the resonant frequency of the wave energy converting apparatus 44 and its associated tension mooring system 50 can be adjusted to "tune" it to the prevailing ocean conditions. Preferably the mass of the base 56 of the vessel 55 is set to match the minimum desired operating frequency of the system. This mass also helps to keep the wave energy converting apparatus 44 in an upright orientation due to the low centre of buoyancy and low centre of mass given to the system by the base 56. As the mass of the vessel 55 decreases the resonant frequency of the system increases.

Figure 11:
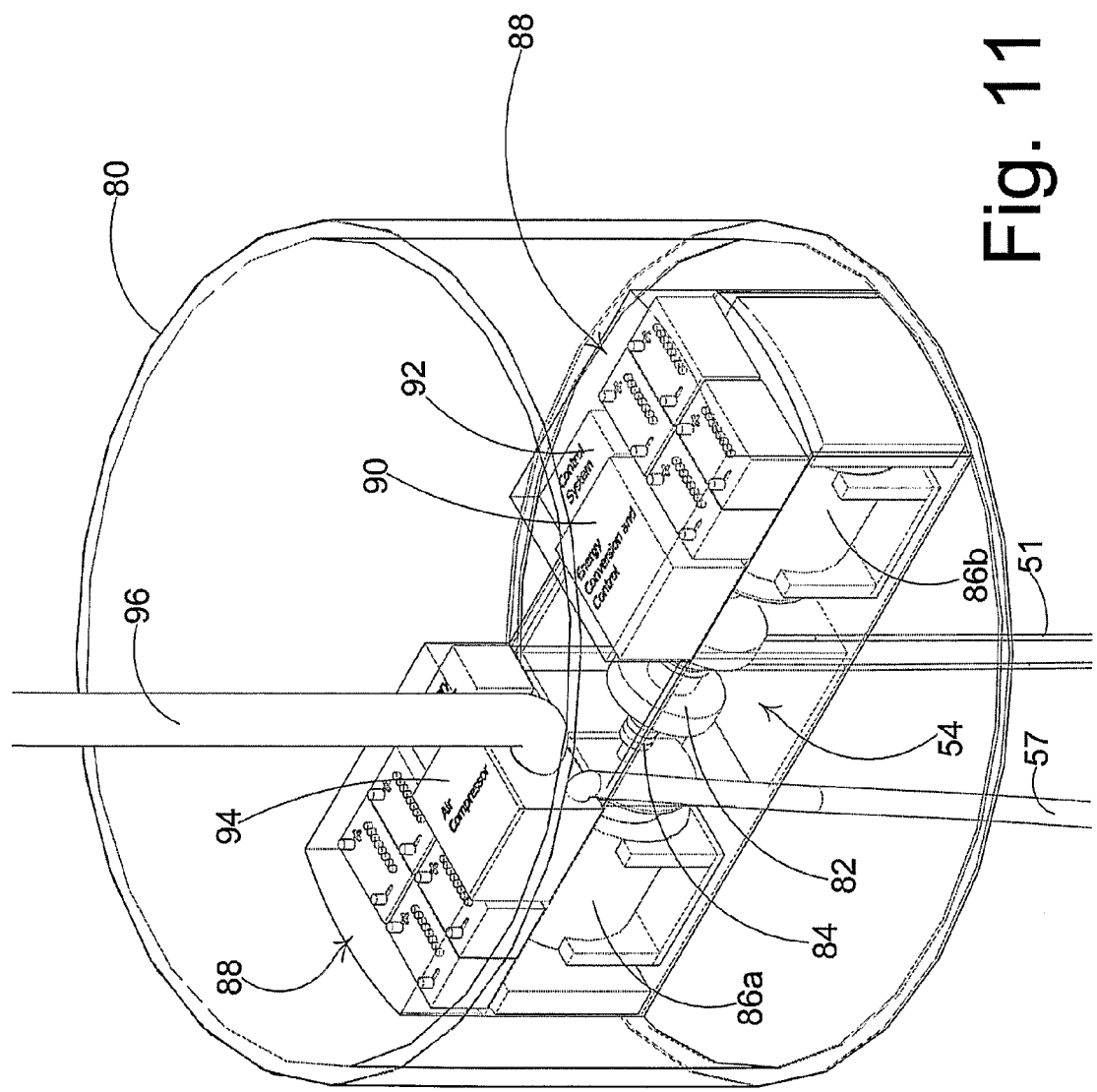
FIG. 11 is a partially transparent, top perspective view of a first embodiment of a mooring caddy which is part of the tension mooring system associated with the wave energy converting apparatus of FIG. 8.
Figure 12:
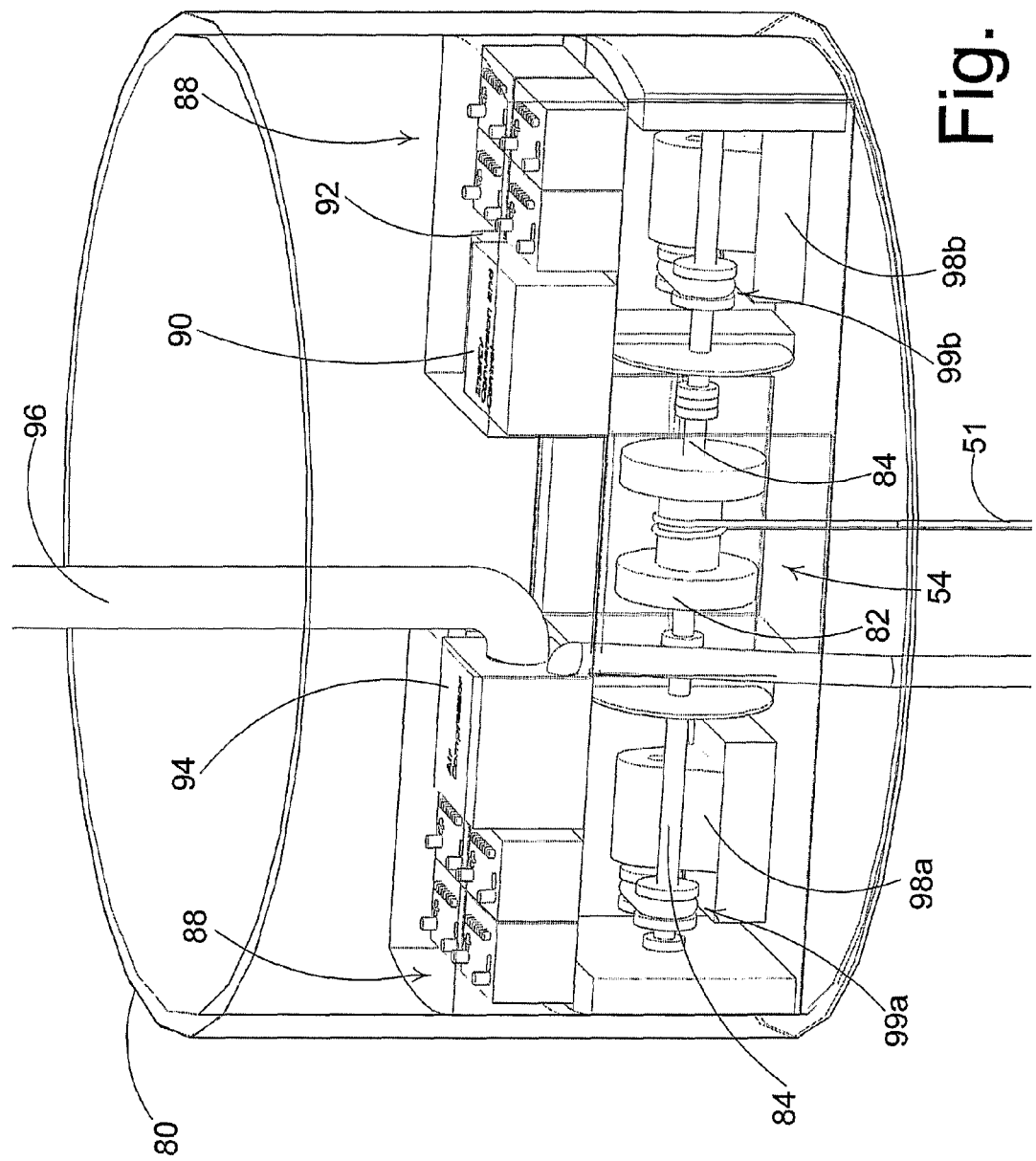
FIG. 12 is a partially transparent, top perspective view of a second embodiment of a mooring caddy which is part of the tension mooring system in accordance with the invention that may be associated with a wave energy converting apparatus.

The pulley mechanism 54 is housed in a mooring caddy 80, which is illustrated with a transparent wall in FIGS. 11 and 12. The mooring caddy 80 is of cylindrical shape in this embodiment to match the shape of the submerged member 46, and may be permanently or releasably attached to the bottom of the submerged member 46. As can be seen most clearly in FIG. 11, the pulley mechanism 54 comprises a pulley 82 fixedly mounted on a shaft 84 which is rotatably mounted between a pair of rotary electrical generators 86a and 86b. As the shaft 84 oscillates, the generators 86a and 86b will generate an EMF and offer resistance to the rotary motion of the shaft. The electrical generators 86 thus provide a dampening means for applying a dampening action to the rotation of the shaft 84 and hence of pulley 82. When a load is applied to the electrical generators 86, they effectively apply a dampening action to the cable 51 via the pulley 82, and hence to the motion of the submerged member 46 by virtue of the counterbalancing means 53.

If desired the electrical energy generated by the generators 86 can be stored in batteries 88 housed in the caddy 80. An electronic energy conversion and control module 90 is provided for converting the AC current generated by the generators 86 into a DC current for storage in the batteries 88. The energy conversion and control module 90 may also be configured to enable the caddy itself to become the wave energy converter apparatus, as will be described in more detail below. A microprocessor operated control system 92 is also provided within the mooring caddy 80, to provide automatic control of all the components of the tension mooring system 50. The control system 92 monitors the frequency of the waves and adjusts the mass of the counterbalancing means accordingly.

An air compressor 94 is provided within the mooring caddy 80, for pumping air down to the counterbalancing means 53 via air hose 57. Some of the power generated by the generators 86 can be used to power the air compressor 94. Air compressor 94 is also under the control of control system 92. An air conduit 96 supplies air from atmosphere to the air compressor 94, and extends upwards through the submerged body 46 to a point above the water line. Air inside the hollow vessel 55 of the counterbalancing means 53 need not be expelled to ambient ocean but could be pumped back up to a pressure vessel (not shown) housed within the mooring caddy 80 or submerged member 46.

A typical operating sequence for the tension mooring system 50 will now be described with reference to FIGS. 8 to 11:

Given a particular operational environment the control system 92 will measure and calculate, via appropriate means such as an accelerometer, the wave frequencies which are presented to the system. The dominant and/or most energy dense frequencies will be determined through calculation using well known formulae. Once the optimal operational frequency has been selected, also from well know formulae, the optimal system mass allowing for the most energy to be extracted can be calculated.

The control system 92 will then calculate the current system mass and determine the volume of water to be taken in, or removed from, the system to achieve this optimal mass. If the mass needs to be decreased, then the control system 92 will activate the air compressor 94 to pump air into the hollow vessel 55 thus evacuating the water present in the hollow vessel 55 through positive pressure displacement as used in submarines. If the mass needs to be increased, then the control system 92 will either open the air valve 58 to expel the air within the hollow vessel 55 or activate the air compressor 94 to pump the air into an alternate storage tank thus allowing water to fill the evacuated volume and increasing the mass of the system.

In this manner the control system 92 will move mass into and out of the tension mooring system 50 thus changing the operational characteristics of the system through mass variation and allowing the system to be tuned to perform optimally in an ever-changing environment.

Any suitable dampening means may be employed in the mooring caddy 80 for applying a dampening action to the motion of the submerged member 46. The electric generators 86 are particularly advantageous as they can be used directly as a source of electrical power. However, a hydraulic pump could also be used to provide the dampening action. FIG. 12 illustrates an alternative embodiment of the mooring caddy 80, which is substantially identical to the embodiment of FIG. 11 except that the rotary electric generators 86 have been replaced with a pair of hydraulic pumps 98 to provide the dampening means. Both hydraulic pumps 98a and 98b are operatively coupled to the shaft 84 by a respective belt and pulley system 99a and 99b. The hydraulic pumps 98 may be used, for example, to pump hydraulic fluid (oil, sea water) via a hose to an hydraulically operated electric generator or hydraulic accumulator. Pneumatic pumps may be used instead of the hydraulic pumps 98.

Figure 8:
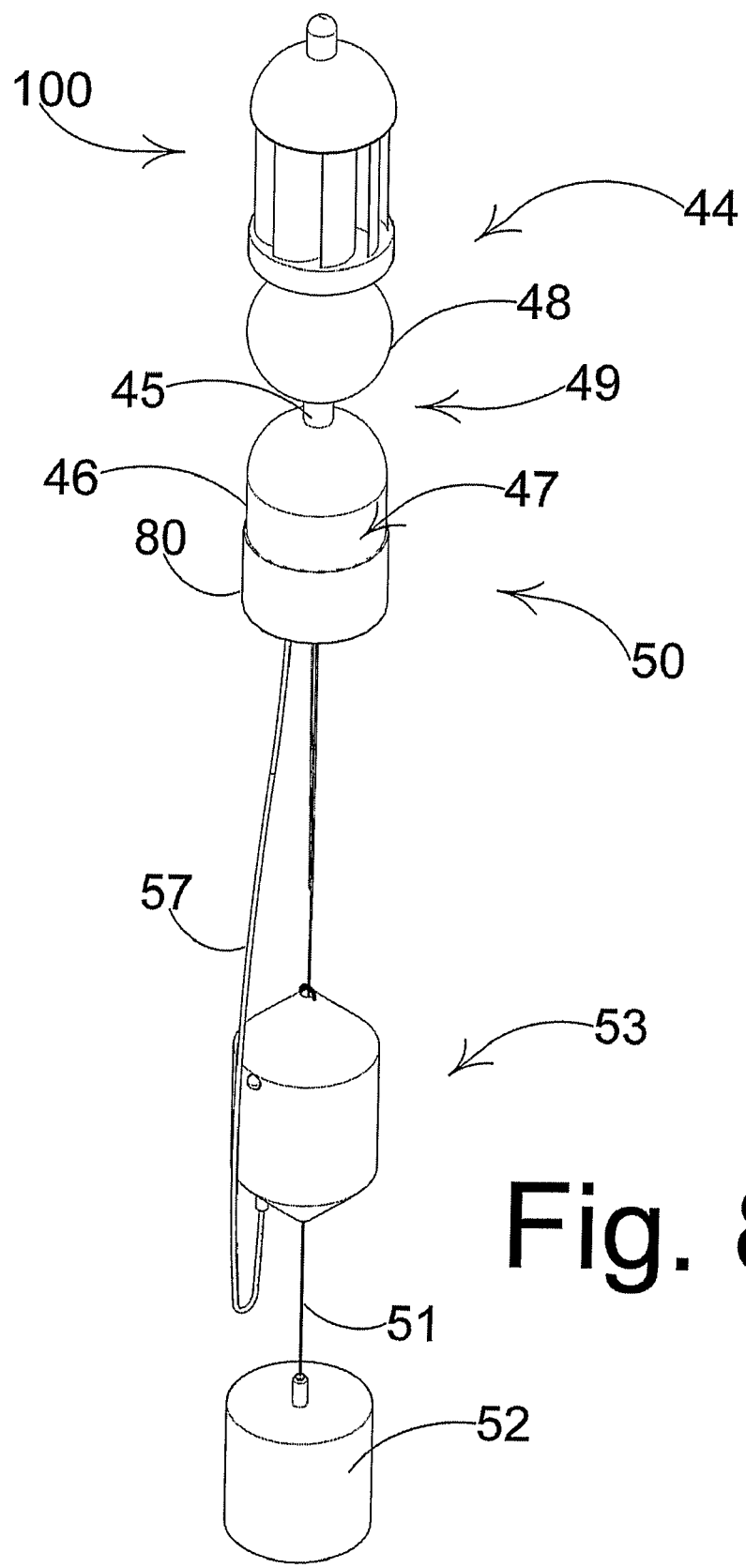
FIG. 8 is a top perspective view of a second embodiment of a wave energy converting apparatus with its associated tension mooring system in accordance with the invention.
Figure 10:
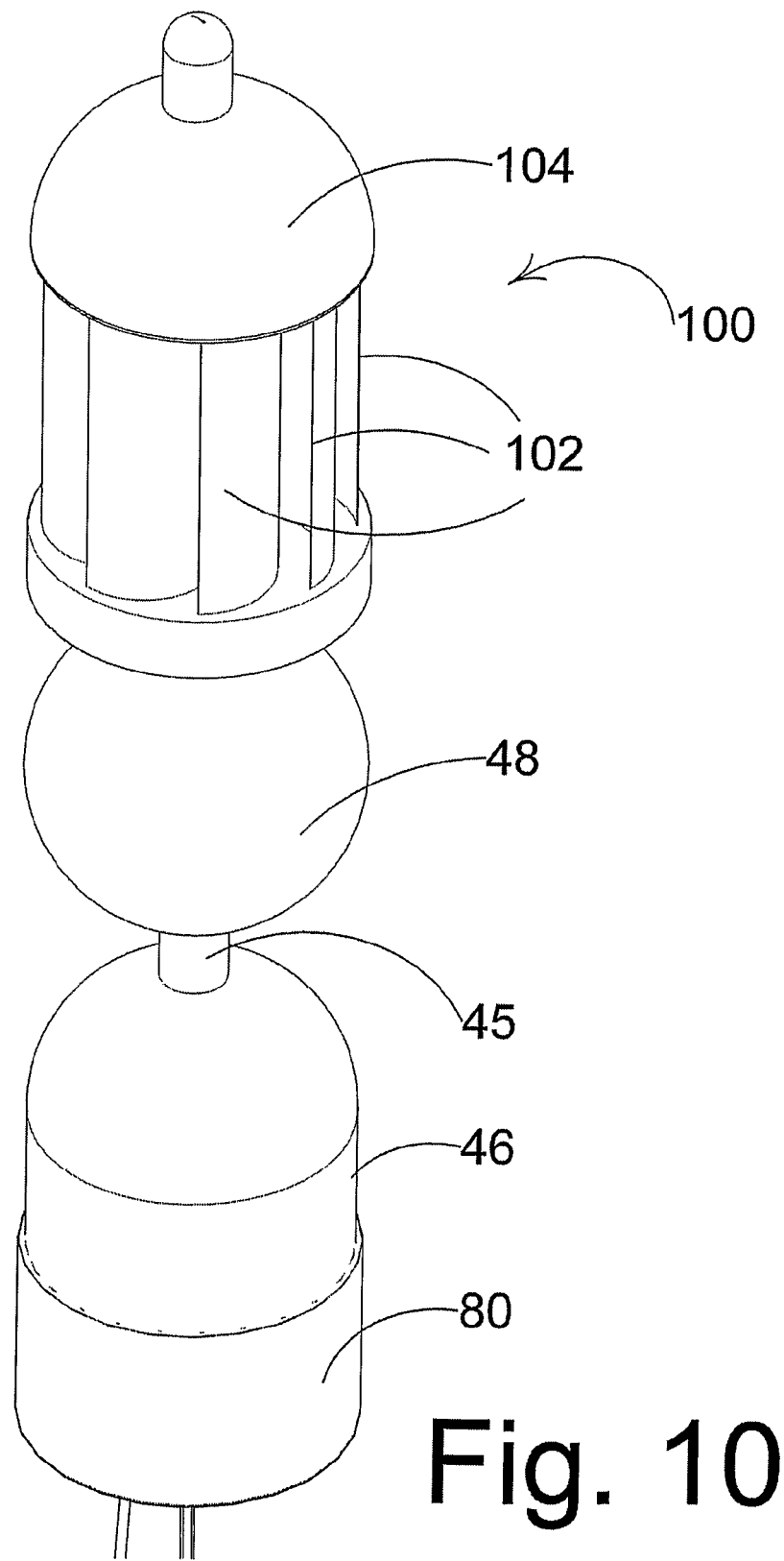
FIG. 10 is an enlarged perspective view of the wave energy converting apparatus and the associated tension mooring system of FIG. 8.

The wave energy converting apparatus 44 shown in FIGS. 8 and 10 incorporates a wind turbine 100 mounted on top of the support structure 45 of the apparatus. The wind turbine 100 provides a means of capturing another source of renewable energy, namely ocean winds. The turbine is oriented to rotate about a vertical axis and is provided with a series of vanes 102 to capture the wind and generate electrical power. A rotary electric generator (not visible) is housed in the base of the wind turbine 100. Electrical power generated by the wind turbine 100 can be stored in the batteries 88, or transmitted to shore via cable or wirelessly using a microwave transmitter (not shown). A dome 104 visible on top of the turbine may be used to house the transmitter and/or a GPS or some other form of positioning beacon.

Figure 13:
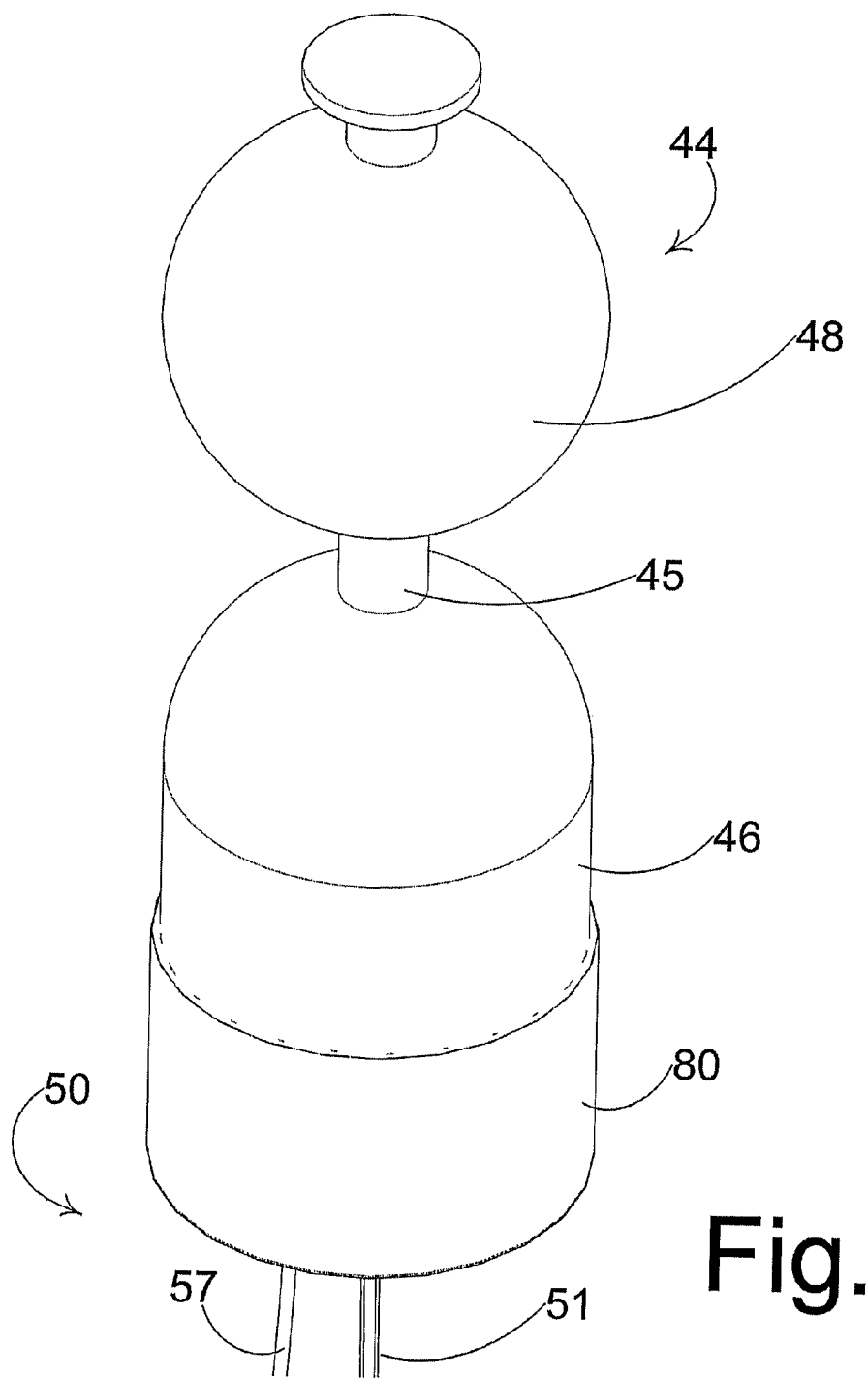
FIG. 13 is a top perspective view of a third embodiment of a wave energy converting apparatus with its associated tension mooring system in accordance with the invention.
Figure 14:
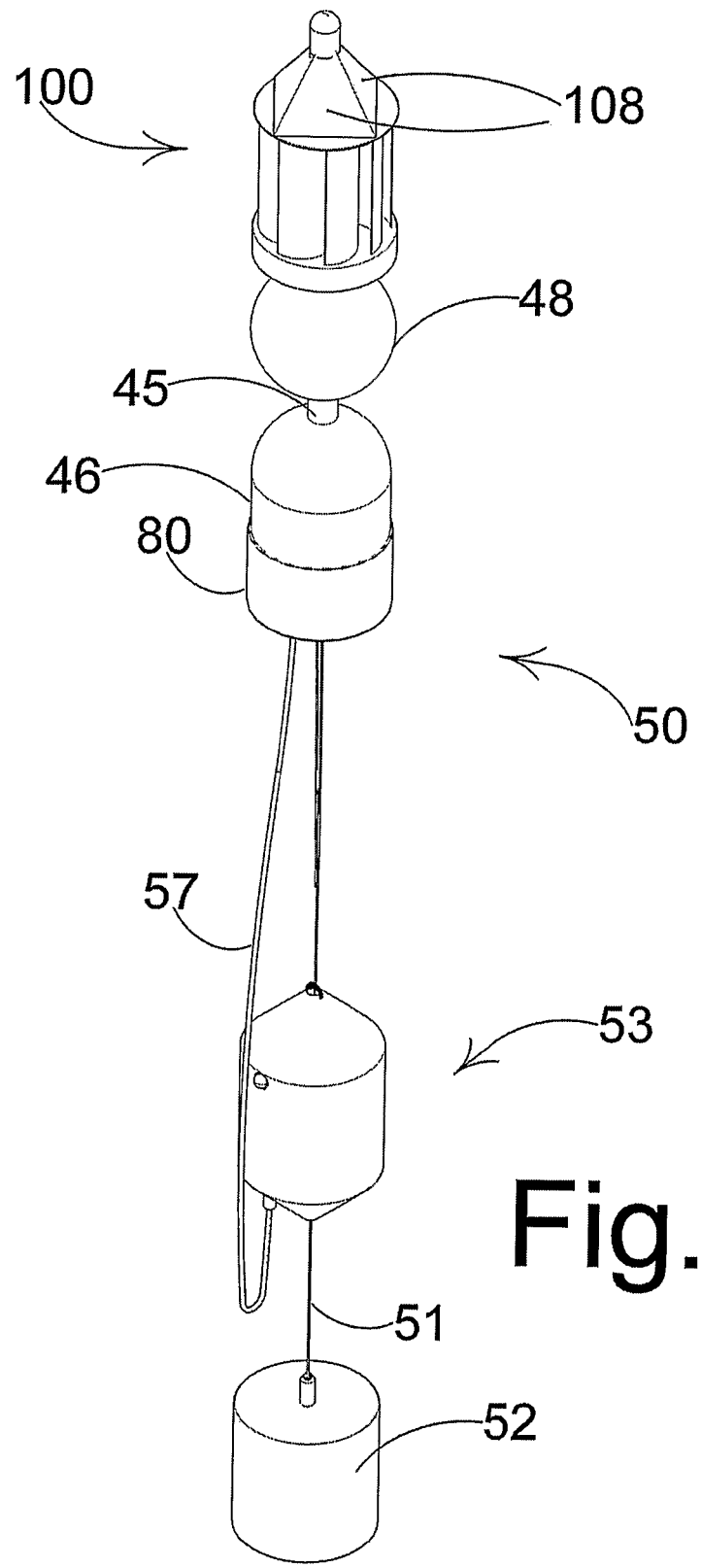
FIG. 14 is a top perspective view of a fourth embodiment of a wave energy converting apparatus with its associated tension mooring system in accordance with the invention.

The wave energy converting apparatus 44 will of course operate perfectly satisfactorily without the wind turbine 100. An embodiment of the apparatus 44 without the turbine is illustrated in FIG. 13. If desired the wave energy converting apparatus 44 can also be fitted with solar panels 108 to take advantage of a third source of renewable energy, namely sunlight. FIG. 14 illustrates an embodiment of the apparatus 44 with a plurality of solar panels 108 mounted on top of the wind turbine 100. In other respects the wave energy converting apparatus 44 of this embodiment (and of the previous embodiment) with its associated tension mooring system 50 is substantially identical to that of the embodiment illustrated in FIGS. 8 to 11 and will not be describe again here.

Figure 15:
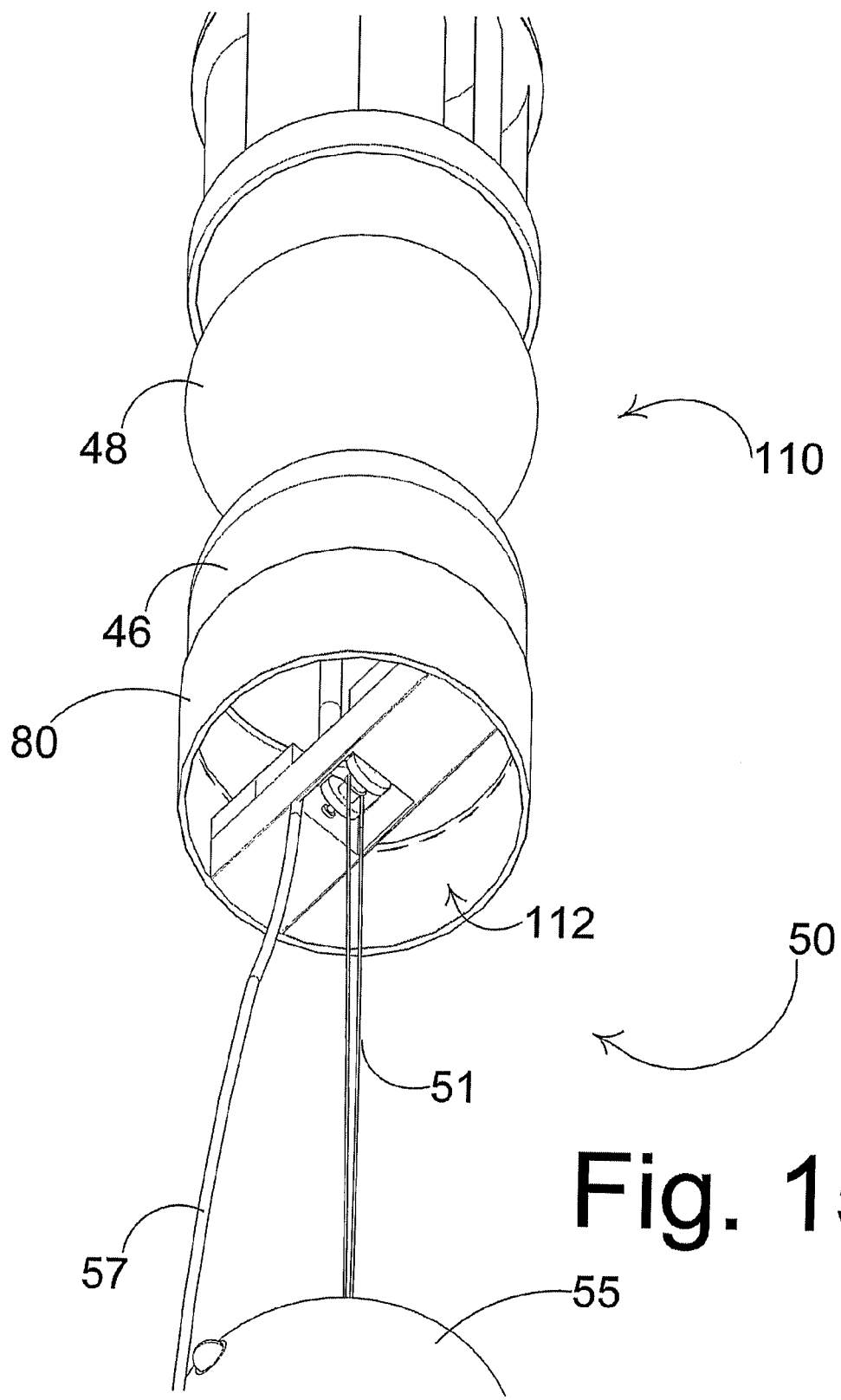
FIG. 15 is a bottom perspective view of a fifth embodiment of a wave energy converting apparatus with its associated tension mooring system in accordance with the invention; and, FIG. 16 is a top perspective view of a sixth embodiment of a wave energy converting apparatus with its associated tension mooring system in accordance with the invention.

FIG. 15 illustrates a fourth embodiment of the wave energy converting apparatus 110, which is similar to the embodiment 44 of FIGS. 8 to 11 and hence the same reference numerals will be used to identify the similar parts.

In this embodiment of the apparatus 110, the housing of the mooring caddy 80 is open at the bottom so as to allow sea water to fill the space within the hollow interior not occupied by the components of the tension mooring system 50. In each of the foregoing embodiments all of the components of the tension mooring caddy housed within the caddy 80 are encapsulated in an air-tight and water-tight casing that protects them from the corrosive effects of sea water.

The open bottom of the mooring caddy 80 creates an air chamber 112 that can be partially filled with air so as to give the mooring caddy neutral buoyancy. As the chamber 112 is open to the ambient ocean its buoyancy will vary with hydrostatic pressure variations due to wave motion. As each wave crest passes the buoyancy of the neutrally buoyant mooring caddy 80 will drop to negative buoyancy as the hydrostatic pressure increases. The mooring caddy will then rise as positive buoyancy occurs when the apparatus 110 enters the trough of the wave. These variations in the buoyancy of the mooring caddy, which is directly connected to the submerged member 46 will be 180° out of phase with the vertical motion of the float member 48, and hence will help to further increase the differential motion of the stator and translator of the linear electric generator 49.

Figure 16:
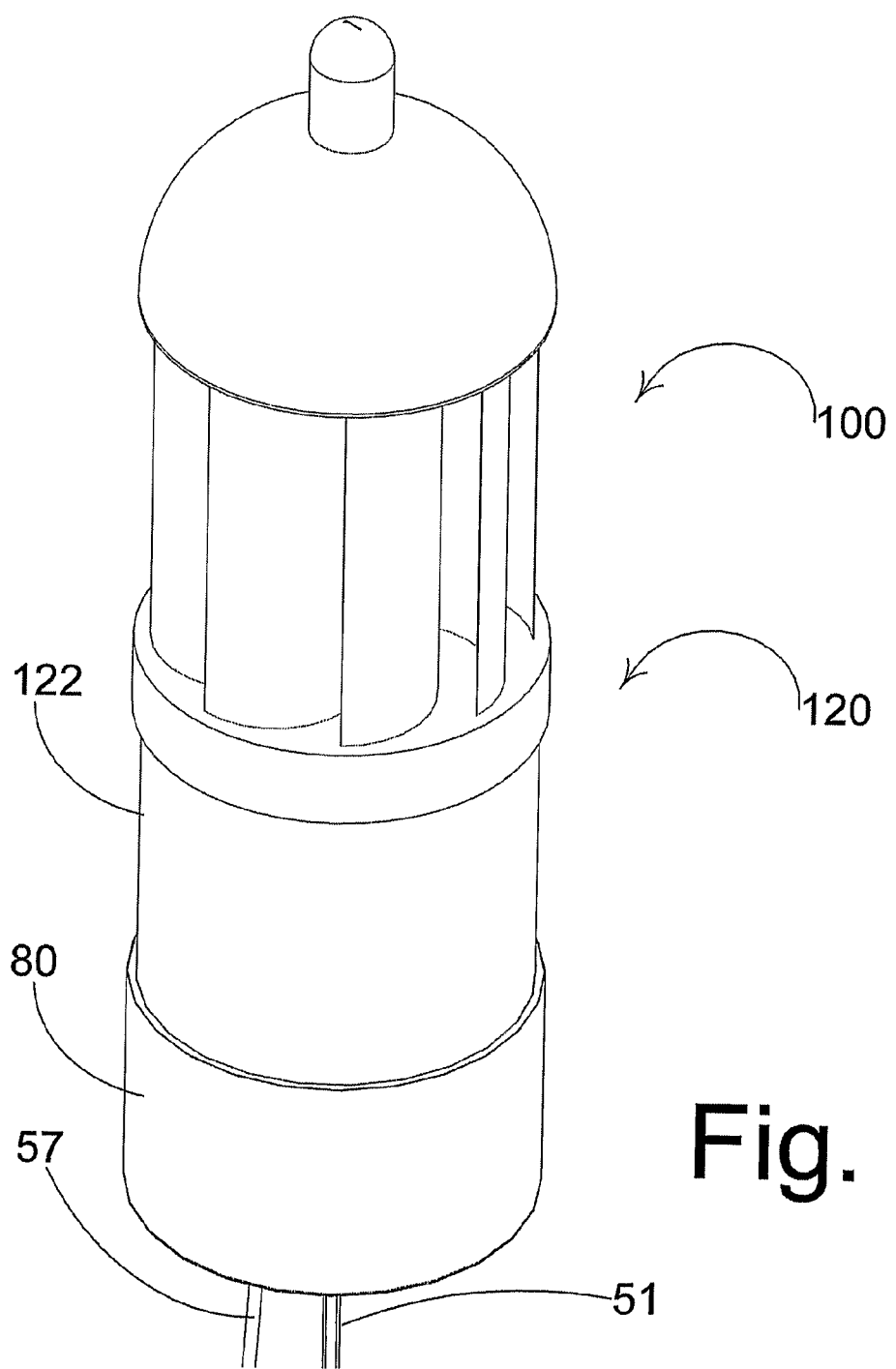

As previously mentioned, the tension mooring system of the present invention may itself be used as a wave energy converting apparatus. FIG. 16 illustrates an embodiment of the tension mooring system 120 which itself has been configured as a wave energy converting apparatus. In this embodiment the mooring caddy 80 is mounted directly to the underside of a buoyant canister 122. There is no linear electric generator as in the previous embodiments. In this embodiment the canister 122 has a wind turbine 100 mounted on top, similar to the embodiment of FIGS. 8 to 11. The tension mooring system 120 operates in a similar way to the embodiment of FIGS. 8 to 11, except that in this case the control system is configured to enable the electric generators 86 to operate at maximum efficiency to generate electrical power as they are not now required to act as dampening means. The tension mooring system 120 still operates as an oscillating system which can be tuned to the frequency of the waves in the ocean to extract maximum energy from the heave response of the canister 122.

Now that several embodiments of the wave energy converting apparatus and tension mooring system have been described in detail, it will be apparent that the described embodiments of the apparatus provide a number of advantages compared with the prior art, including the following:
 (i) The wave energy converter is robust in design, being able to withstand most weather conditions with minimal likelihood of damage.
 (ii) The tension mooring system enables the wave energy converting apparatus to be tuned to the prevailing ocean conditions to maintain maximum efficiency.
 (iii) The tension mooring system can be adapted for use with any buoyancy type wave energy converting apparatus to improve its operating efficiency.
 (iv) It is versatile, being able to extract energy from waves covering a large range of wave heights, wave frequencies and wave directions.
 (v) It is very efficient, using the principles of surge, heave, buoyancy hydrostatic and hydrodynamic pressure to extract the maximum amount of energy from the waves.

It will be readily apparent to persons skilled in the relevant arts that various modifications and improvements may be made to the foregoing embodiments, in addition to those already described, without departing from the basic inventive concepts of the present invention. For example, the stator need not be located on a central plane or axis of the apparatus, but could be located elsewhere in the support structure of the wave energy converting apparatus. Therefore, it will be appreciated that the scope of the invention is not limited to the specific embodiments described and is to be determined from the appended claims.

The invention claimed is:

1. A tension mooring system for an apparatus for converting ocean wave energy into a more usable form, the apparatus having a structure with a submerged member provided in connection therewith below a mean water level, the mooring system comprising:
   an elongate flexible member extending from a ballast means through a counterbalancing means, the counterbalancing means being suspended from the submerged member by the elongate flexible member via a pulley mechanism; and
   a dampening means for applying a dampening action to the motion of the submerged member, the dampening means applying the dampening action to the elongate flexible member via the pulley mechanism.

2. A tension mooring system as defined in claim 1, wherein the dampening means comprises a rotary electric generator.

3. A tension mooring system as defined in claim 1, wherein the dampening means comprises a braking system.

4. A tension mooring system as defined in claim 1, wherein the dampening means comprises an energy conversion or extraction system.

5. A tension mooring system as defined in claim 1, wherein the counterbalancing means comprises a vessel having a mass provided in connection therewith to provide a counterbalancing force applied to the submerged member via the elongate flexible member.

6. A tension mooring system as defined in claim 5, wherein the counterbalancing means comprises an adjustable buoyancy vessel having a mass provided in connection therewith, wherein the buoyancy of the counterbalancing means can be adjusted to vary the counterbalancing force applied to the submerged member via the elongate flexible member.

7. A tension mooring system as defined in claim 6, wherein the buoyancy of the counterbalancing means can be adjusted by moving a fluid into and out of the buoyancy vessel via a fluid transport mechanism.

8. A tension mooring system as defined in claim 7, further comprising an air compressor for pumping air via an air hose to the buoyancy vessel.

9. A tension mooring system as defined in claim 1, further comprising a mooring caddy, and wherein the submerged member of the structure can be coupled to the mooring caddy.

10. A tension mooring system as defined in claim 9, wherein the dampening means, the pulley mechanism and an air compressor are all housed in the mooring caddy.

11. A tension mooring system as defined in claim 9, wherein the dampening means, the pulley mechanism, an air compressor and an adjustable buoyancy tank are all housed in the mooring caddy.

12. A tension mooring system as defined in claim 9, wherein the submerged member is secured in the mooring caddy by a locking mechanism.

13. A tension mooring system as defined in claim 12, wherein the locking mechanism automatically secures the submerged member to the mooring caddy as it docks in the mooring caddy.

14. An apparatus for converting ocean wave energy into a more usable form, the apparatus comprising:
   an elongate support structure designed to extend above a mean water level, having a submerged member provided in connection therewith below the mean water level and a buoyant means to enable the support structure to float in the ocean in a generally upright orientation;
   a float member of positive buoyancy slidably mounted on the support structure so as to be movable in a vertical direction, the float member being provided with a hydroplane surface that converts a horizontal component of the wave motion into a vertical movement of the float member, thus enhancing the energy extracting capacity of the float member;
   the float member has an elongate horizontal cross-section with a front end and a rear end, the front end being adapted to face into the general direction of an approaching wave;
   the hydroplane surface on the float member is one of a plurality of substantially parallel hydroplane surfaces extending substantially perpendicularly to and along respective first and second sides of the float member; and
   an energy extraction means provided in connection with the support structure and the float member, so that when wave motion causes a suitable differential motion between the float member and the support structure said energy extraction means converts the incident energy into a more usable form.

15. An apparatus for converting ocean wave energy as defined in claim 14, wherein the plurality of hydroplane surfaces are inclined downwards from the front end to the rear end of the float member, wherein water particles in a wave are forced downwards by the hydroplane surfaces, creating hydrodynamic forces acting upwards on the hydroplane surfaces which are added to an upward force acting on the float member due to its positive buoyancy.

* * * * *